April 1, 1969  S. TAUB  3,435,820
ILLUMINATING ENDOSCOPE WITH DETACHABLE SHIELD
Filed Feb. 16, 1966
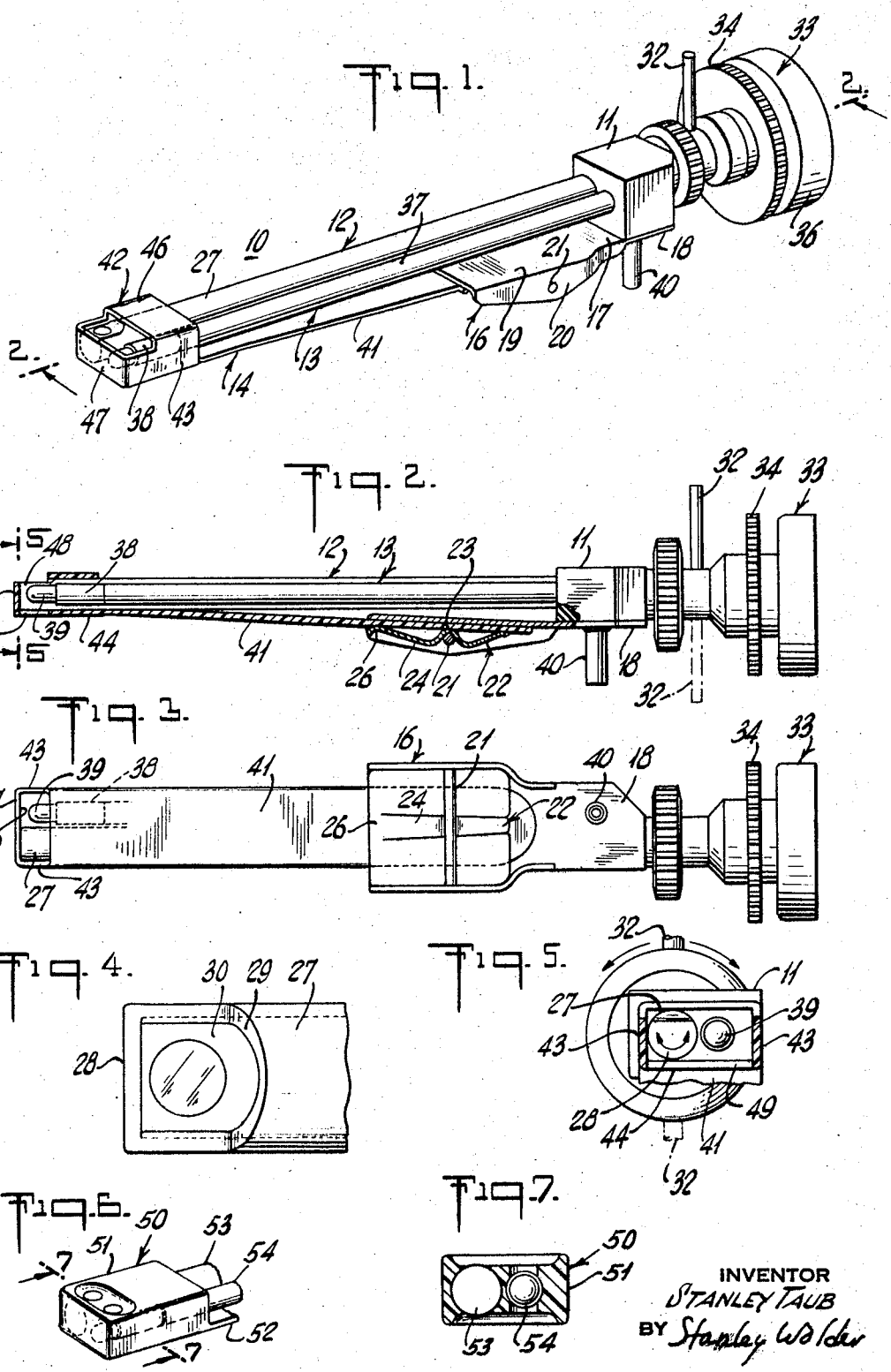
INVENTOR
STANLEY TAUB
BY *Stanley Walder*
ATTORNEY

United States Patent Office 3,435,820
Patented Apr. 1, 1969

3,435,820
ILLUMINATING ENDOSCOPE WITH
DETACHABLE SHIELD
Stanley Taub, 134 Joralemon St.,
Brooklyn, N.Y. 11201
Filed Feb. 16, 1966, Ser. No. 527,973
Int. Cl. A61b 1/06
U.S. Cl. 128—11                            6 Claims

ABSTRACT OF THE DISCLOSURE

An endoscope includes a mounting member rotatably supporting a telescope barrel and a parallel tube carrying a lamp adjacent the barrel distal end. The mounting member also releasably supports a depressor strip terminating in a shield member surrounding the distal sections of the tube and barrel and having windows providing transverse optical access to the lamp and a reflector mounted at the end of the telescope barrel, the barrel being rotatable relative to the shield while the barrel distal end and lamp are spaced from the observed tissue.

---

The present invention relates generally to improvements in endoscopic instruments and it relates more particularly to an improved oral panendoscope highly useful for direct visual observation and photography of the velopharyngeal and laryngeal areas during phonation.

In many clinical studies and examinations it is highly desirable to effect a visual observation and an audiovisual recording of the operation of the speech mechanism during the production of speech sounds in normal and abnormal subjects, and a direct clinical or photographic laryngoscopy is generally required without alteration or distortion of the natural position of the larynx. Various illumination and optical instruments have been heretofore employed for the visual examination of the oral and other body cavities but these possess numerous drawbacks and disadvantages particularly when applied to the direct visual observation and photography of certain areas of the oral cavity without undesirable instrument alteration and distortion thereof, such as that of the velopharyngeal and laryngeal areas during phonation. The conventional endoscopes are generally awkward devices of limited application and scope, of limited and inadequate illumination and of little adaptability and flexibility, difficult to manipulate and maneuver and otherwise leave much to be desired.

It is therefore a principal object of the present invention to provide an improved endoscopic instrument.

Another object of the present invention is to provide an improved panendscope for examination of the oral cavity.

Still another object of the present invention is to provide an improved endoscope highly suitable for direct visual observation and photography of the velopharyngeal and laryngeal areas during phonation.

A further object of the present invention is to provide an improved panendoscope for direct clinical or photographic laryngoscopy without alteration or distortion of the natural position of the larynx.

Still a further object of the present invention is to provide an instrument of the above nature characterized by its simplicity, ruggedness, adaptability, flexibility and ease of use.

The above and other objects of the present invention will become apparent from a reading of the following description taken in conjunction with the accompanying drawing wherein:

FIGURE 1 is a front perspective view of an endoscope embodying the present invention;

FIGURE 2 is a sectional view taken along line 2—2 in FIGURE 1;

FIGURE 3 is a bottom plan view thereof;

FIGURE 4 is a fragmentary top plan view of the distal end thereof; and

FIGURE 5 is a sectional view taken along line 5—5 in FIGURE 2;

FIGURE 6 is a fragmentary persepctive view of another form of oral shield;

FIGURE 7 is a sectional view taken along line 7—7 in FIGURE 6.

In a sense the present invention contemplates the provision of an endoscope comprising an elongated barrel, a lens system housed in said barrel and including an objective directed toward the distal end of said barrel, an illuminating member located adjacent the distal end of said barrel, a depressor member and means releasably supporting said depressor member in a position underlying said barrel and illumination member.

According to a preferred form of the present invention there is provided a mounting member which supports a forwardly projecting parallel telescope lens system housing barrel and conductor carrying tube, the telescope barrel being rotatable about its longitudinal axis. An angularly disposed reflecting element is mounted at the distal end of the barrel to provide the telescope with a viewing field with an axis which is oblique to the longitudinal axis of the barrel and an eyepiece and a coupling ring is located at the proximal end of the telescope barrel. An electric bulb is mounted at the distal end of the tube adjacent to the reflector element and is connected by way of conductors housed in the tube to an electrical connector supported by the mounting member. A clip member is affixed to the underface of the mounting member and releasably engages the proximal end of a tongue depressor blade which underlies the barrel and tube and extends along the length thereof and terminates at its distal end in a housing or shield which encloses the distal end of the barrel and tube and is provided with an upper wall having an aperture therein registering with the distal end of the barrel and the electric bulb, and is open at its rear.

Referring now to the drawing which illustrates a preferred embodiment of the present invention, the reference numeral 10 generally designates the improved endoscope which includes a mounting section 11, and optical or telescope section 12, an illumination section 13 and a replacable tongue depressor and shield member 14. The mounting section 11 is in the form of a block having a flat underface to which is secured a depressor engaging or clip member 16.

The clip member 16 comprises a longitudinally extending horizontal top plate 17 including a narrow rear section 18 underlying and suitably fastened to the underface of the mounting block 11 and substantially coinciding with said underface and a relatively wider coplanar front section 19. Depending from the side edges of the plate front section 19 are a pair of longitudinally extending parallel flanges 20, each having downwardly converging bottom edges, and a medially located cross pin 21 extends transversely between and is supported by the flanges 20 at a point below the underface of the plate section 19. A clip or leaf spring is engaged by and between the confronting faces of the pin 21 and the plate front section 19 and includes a transversely extending downwardly concave intermediate section 23 engaging the upper part of the pin 21 and integrally formed forwardly and rearwardly projecting resilient wings 24 which are downwardly convex and terminate in transverse upwardly convex lips 26 which are resiliently urged toward engagement with the underface of the plate front section 19.

The telescope section 12 comprises an elongated longitudinally extending tubular barrel 27 having a proximal section projecting through and journalled in a longitudinal bore formed in the mounting block 11 and locked against longitudinal movement therein. A conventional endoscope telescopic lens system is housed in the barrel 27 and is directed toward the distal end thereof. The distal end of the barrel 27 is provided with an end wall 28 and has an opening 29 formed therein. A reflecting element 30 in the form of a reflector prism or mirror is mounted in the barrel 27 in registry with the opening 29 and the reflecting surface thereof intersects the optical axis of the telescope lens system and is so inclined as to deflect the viewing axis through the opening 29 obliquely to the longitudinal axis of the barrel 27 and preferably 90° thereto.

A radially projecting control rod 32 is suitably mounted in the barrel 27 rearwardly of the mounting block 11 to facilitate the rotation of the barrel 27 about its longitudinal axis and correspondingly rotate the field of view of the telescopic member 12 from the reflector element 30 about the longitudinal axis of the barrel 27. Mounted to the proximal end of the barrel 27 rearwardly of the control rod 32 is a rearwardly directed eyeshade member 33. The eyeshade member 33 is rotatable about its axis and is provided with a knurled turning wheel 34 affixed thereto to permit the rotation of the shade member 33 independently of the barrel 27. The peripheral wall 36 of the eyeshade member 33 is internally threaded to define a coupling ring which permits the connection of the telescope member 12 to a camera or other lens system.

The illumination section 13 comprises a tubular member 37 projecting forwardly from the mounting block 11 parallel to and slightly laterally spaced from the barrel 27. A bulb socket 38 is mounted at the free distal end of the tubular member 37 and releasably engages an electric light bulb 39 along the side of the distal end of the barrel 27. A pair of conductors extend from the bulb socket 38 through to tubular member 37 into the mounting block 11. A two contact electrical coupling member 40 depends from and is secured to the underface of the block 11 and the contact elements thereof are connected to corresponding conductors passing through the tubular member 37. The coupling member 40 is connected to a low voltage source such as a battery or by way of a step-down transformer to an AC line by a mating coupling means to energize the bulb 39.

The tongue depressor and shield member 14 includes a tongue depressor section 41 in the shape of an elongated narrow strip or blade of conventional tongue depressor dimensions and somewhat wider than the outside lateral spacing of the barrel 27 and tubular member 37. The rear end of the depressor section 41 is releasably engaged by the clip member 16, being resiliently entrapped between the confronting faces of the clip wall 19 and the spring lips 26.

Integrally formed with the depressor section 41 and advantageously formed therewith of a heat resistant synthetic organic polymer is a heat shield member 42 which functions to space the bulb 39 from the adjacent tissue to protect the latter and prevent the deposition of body fluids on he bulb or reflector. The shield member 42 includes a pair of side walls 43 projecting vertically upwardly from the side edges of the depressor distal end section 44 which defines the horizontal bottom wall of the shield 42. A top wall 46 extends between the rear section of the upper edges of the side walls 43 and terminates at a point rearwardly of the forward edges of the side walls 43 as does the bottom wall 44 whose front edge is in underlying alignment with that of the top wall 46. A vertical front end wall 47 extends between the front edges of the side walls 43 and delineates with the top and bottom walls 46 and 44, top and bottom shield openings 48 and 49 respectively. It should be noted that when the depressor and shield member 14 is in engagement with the clip member 16 as described above, the openings 48 and 49 are in registry with the bulb 39 and the distal end of the barrel member 27 whereby to illuminate the area above and below the distal end of the endoscope through the openings 48 and 49 and afford visual access by the telescope 12, likewise through the openings 48 and 49 and in any direction depending upon the orientation of the reflector element 30 as controlled by the rod 32. The shield 42 may be of other configurations provided that it permits the upward and downward passage of light from and to the distal end of the endoscope.

In employing the improved endoscope described above the bulb 39 is energized and the instrument is inserted into the subject's oral cavity with the reflector element directed upwardly and may be manipulated for viewing the posterior pharynx and nasopharynx. The muscular activity of the palatopharyngeal sphincter mechanism is clearly observable while the subject recites various combinations of vowel-consonant-vowel sounds. The reflector element 30 may be rotated 180° by manipulating the rod 32 for viewing the larynx during the production of various vowel sounds. For either still or motion picture photography, the camera lens barrel is screwed to the internally threaded coupling ring 33. There is thus easily and conveniently visible the entire laryngeal mechanism and surrounding structures for various examinations and studies with a minimum of discomfiture to the subject and the absence of any hazards whatsoever. The mouth may be closed with the instrument inserted and any significant alteration or distortion of the natural position of the larynx may be avoided. Moreover, the tongue depressor and shield member 14 is easily and rapidly replaceable.

Referring to FIGURES 6 and 7 of the drawing there is illustrated a form of heat shield which may be substituted to advantage for the shield 42 in the embodiment last described, the instruments being in other respects similar. Specifically the shield 50 includes a rectangular block 51 formed integrally with the distal end of a depressor blade 52, the proximal end of which is releasably engaged as in the first embodiment. A pair of parallel longitudinal bores are formed in the block 51 which slidably engage the distal sections of the telescope barrel 53 and the bulb mount tube 54. There are formed in the top and bottom faces of the block 51 circular apertures which communicate with the distal ends of the block bores thereby affording light communication with the bulb mounted at the distal end of the tube 54 and the reflector element mounted at the distal end of the barrel 53.

The device last described is employed in the manner of the first embodiment.

While there have been described and illustrated preferred embodiments of the present invention, it is apparent that numerous alterations, omissions and additions may be made without departing from the spirit thereof.

What is claimed is:

1. An endoscope comprising a mounting member, an elongated telescope barrel projecting forwardly of and rotatably supported at its proximal section by said mounting member, an illumination member located adjacent the distal end of said barrel, a shield located adjacent to and substantially surrounding said illuminating member and the distal end of said barrel and having a transparent window therein registering with said barrel distal end and said illumination member, a depressor member joined to and projecting rearwardly from said shield member, and means on said mounting member releasably engaging the proximal end of said depressor member, said shield member having a rearwardly directed opening through which said barrel projects, said barrel being axially rotatable relative to said shield member.

2. The endoscope of claim 1 including a reflector element mounted at the distal end of said barrel in axial alignment with said barrel to provide a viewing field having an axis oblique to that of said barrel.

3. The endoscope of claim 1 including an eyepiece located at the proximal end of said barrel.

4. The endoscope of claim 1 including a coupling ring mounted at the proximal end of said barrel.

5. An endoscope comprising a mounting member, a telescope barrel projecting forwardly of and rotatably supported at its proximal section of said mounting member and extending to a distal end, a tube supported by said mounting member and extending substantially parallel to said barrel, an illumination member comprising an electric bulb mounted at the distal end of said tube adjacent to the distal end of said barrel, conductors extending through said tube and connected to said electric bulb, means for connecting said conductors to a source of current, a depressor member supporting means being secured to said mounting member, a depressor member releasably engaged by and projecting forwardly in cantilever fashion from said releasable supporting means beyond the distal ends of said barrel and tube and provided at its distal end with a shield member substantially surrounding the distal end of said barrel and said electric bulb and including a top wall overlying said barrel distal end and said electric bulb and having an opening therein registering with said barrel distal end and said electric bulb, and comprising a reflector element mounted at the distal end of said barrel in axial alignment therewith to provide a viewing field having an axis oblique to that of said barrel.

6. The endoscope of claim 5 wherein said means for connecting said conductors to a source of current comprises an electrical coupling member carried by said mounting member and connected to said conductors.

References Cited

UNITED STATES PATENTS

| | | |
|---|---|---|
| 1,292,326 | 1/1919 | Jacobson. |
| 1,945,380 | 1/1934 | Russell _____ 128—11 |
| 1,990,972 | 2/1935 | Arnesen _____ 128—16 XR |
| 2,690,744 | 10/1954 | Wallace _____ 128—6 |
| 2,936,753 | 5/1960 | Storz _____ 128—6 |
| 3,349,764 | 10/1967 | Edinger et al. _____ 128—16 |

FOREIGN PATENTS

| | | |
|---|---|---|
| 657,331 | 1/1929 | France. |
| 212,474 | 8/1909 | Germany. |
| 403,896 | 1/1934 | Great Britain. |

RICHARD A. GAUDET, *Primary Examiner.*

K. L. HOWELL, *Assistant Examiner.*

U.S. Cl. X. R.

128—16